(12) United States Patent
Kemp et al.

(10) Patent No.: US 11,230,000 B2
(45) Date of Patent: Jan. 25, 2022

(54) MOBILE MANIPULATION DEVICE

(71) Applicant: Georgia Tech Research Corporation, Atlanta, GA (US)

(72) Inventors: Charles Clark Kemp, Atlanta, GA (US); Henry Mandus Clever, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 598 days.

(21) Appl. No.: 15/924,052

(22) Filed: Mar. 16, 2018

(65) Prior Publication Data

US 2018/0264641 A1 Sep. 20, 2018

Related U.S. Application Data

(60) Provisional application No. 62/473,778, filed on Mar. 20, 2017, provisional application No. 62/474,427, (Continued)

(51) Int. Cl.
*B25J 5/00* (2006.01)
*B25J 11/00* (2006.01)
(Continued)

(52) U.S. Cl.
CPC ............. *B25J 5/007* (2013.01); *B25J 11/008* (2013.01); *B25J 15/0019* (2013.01); *B25J 15/0028* (2013.01); *B25J 15/0616* (2013.01); *B25J 17/02* (2013.01); *B25J 19/023* (2013.01); *B25J 9/1664* (2013.01); *B25J 13/06* (2013.01); *B25J 15/08* (2013.01); *F16M 11/08* (2013.01); *F16M 11/18* (2013.01); *F16M 11/2021* (2013.01); *F16M 11/2092* (2013.01); *F16M 11/24* (2013.01); *F16M 11/42* (2013.01); *G05B 19/409* (2013.01); *G06F 3/0488* (2013.01); *G06F 3/04815* (2013.01); *G06F 3/04817* (2013.01); (Continued)

(58) Field of Classification Search
None
See application file for complete search history.

(56) References Cited

U.S. PATENT DOCUMENTS 4,151,534 A * 4/1979 Bond .................... H01Q 1/1235
343/883
4,636,137 A * 1/1987 Lemelson ................ B25J 5/005
348/114
(Continued)

FOREIGN PATENT DOCUMENTS

CN 206899277 U * 1/2018

OTHER PUBLICATIONS

Affixed—definition of affixed by The Free Dictionary from https://www.thefreedictionary.com/affixed; Mar. 2021.*
(Continued)

*Primary Examiner* — Michael S Lowe
(74) *Attorney, Agent, or Firm* — Mintz Levin Cohn Ferris Glovsky and Popeo, P.C.

(57) ABSTRACT

The mobile manipulation device includes a base, a lift, an arm, and a manipulator. The base is able to move across a surface underneath the base. The lift is coupled to the base. The lift moves the arm vertically. The arm moves the manipulator horizontally along one direction. The base is able to move perpendicular to the one direction.

22 Claims, 8 Drawing Sheets

Related U.S. Application Data filed on Mar. 21, 2017, provisional application No. 62/626,265, filed on Feb. 5, 2018.

(51) Int. Cl.

| | |
|---|---|
| *B25J 15/00* | (2006.01) |
| *B25J 15/06* | (2006.01) |
| *B25J 17/02* | (2006.01) |
| *B25J 19/02* | (2006.01) |
| *G06F 3/0481* | (2013.01) |
| *G06F 3/0484* | (2013.01) |
| *B25J 15/08* | (2006.01) |
| *B25J 9/16* | (2006.01) |
| *G05B 19/409* | (2006.01) |
| *F16M 11/18* | (2006.01) |
| *G06F 3/0488* | (2013.01) |
| *B25J 13/06* | (2006.01) |
| *F16M 11/08* | (2006.01) |
| *F16M 11/20* | (2006.01) |
| *F16M 11/24* | (2006.01) |
| *F16M 11/42* | (2006.01) |

(52) U.S. Cl.
CPC ......... *G06F 3/04847* (2013.01); *Y10S 901/01* (2013.01); *Y10S 901/02* (2013.01); *Y10S 901/31* (2013.01)

(56) References Cited

U.S. PATENT DOCUMENTS

| | | | | |
|---|---|---|---|---|
| 5,965,827 | A * | 10/1999 | Stanley | G01L 5/10 73/862.391 |
| 7,048,258 | B1 | 5/2006 | Dromgool | |
| 7,824,144 | B2 * | 11/2010 | Wilson | B62B 5/0003 414/421 |
| 9,150,355 | B2 | 10/2015 | Hortig | |
| 9,789,603 | B2 * | 10/2017 | Jacobsen | B25J 3/04 |
| 2009/0106993 | A1 * | 4/2009 | McKenna | E04G 21/1808 33/427 |
| 2010/0036287 | A1 * | 2/2010 | Weber | G01L 1/242 600/595 |
| 2012/0328395 | A1 * | 12/2012 | Jacobsen | B25J 3/04 414/1 |
| 2013/0310717 | A1 * | 11/2013 | Ranky | A63B 21/4025 601/40 |
| 2014/0246258 | A1 | 9/2014 | Wyrobek | |
| 2014/0277691 | A1 | 9/2014 | Jacobus | |
| 2015/0050111 | A1 | 2/2015 | Townsend | |
| 2016/0121486 | A1 * | 5/2016 | Lipinski | B05B 3/00 427/427.3 |
| 2018/0267690 | A1 * | 9/2018 | Kemp | G06F 3/04817 |

OTHER PUBLICATIONS

Bien et al. "Integration of a rehabilitation robotic system (KARES II) with human-friendly man-machine interaction units." Autonomous robots 16.2 (2004): 165-191.

Brooks et al. "Sensing and manipulating built-for-human environments." International Journal of Humanoid Robotics 1.01 (2004): 1-28.

Caselli et al. "Toward a mobile manipulator service robot for human assistance." 1st Robocare Workshop. 2003.

Choi et al. "Hand it over or set it down: A user study of object delivery with an assistive mobile manipulator." Robot and Human Interactive Communication, 2009. RO-MAN 2009. The 18th IEEE International Symposium on. IEEE, 2009.

Graf et al. "Care-O-bot II—Development of a next generation robotic home assistant." Autonomous robots 16.2 (2004): 193-205.

Graf et al. "Mobile robot assistants." IEEE Robotics & Automation Magazine 11.2 (2004): 67-77.

Grice et al. "Autobed: Open hardware for accessible web-based control of an electric bed." Georgia Institute of Technology, 2016.

Grupen et al. "White paper: Integrating manual dexterity with mobility for human-scale service robotics-the case for concentrated research into science and technology supporting next-generation robotic assistants." Google Scholar (2004).

Hawkins et al. "Assistive mobile manipulation for self-care tasks around the head." Computational Intelligence in Robotic Rehabilitation and Assistive Technologies (CIR2AT), 2014 IEEE Symposium on. IEEE, 2014.

Jain et al. "EL-E: an assistive mobile manipulator that autonomously fetches objects from flat surfaces." Autonomous Robots 28.1 (2010): 45.

Kapusta et al. "Optimization of robot configurations for assistive tasks." (2016).

Khatib et al. "Robots in human environments: Basic autonomous capabilities." The International Journal of Robotics Research 18.7 (1999): 684-696.

King et al. "Dusty: an assistive mobile manipulator that retrieves dropped objects for people with motor impairments." Disability and Rehabilitation: Assistive Technology 7.2 (2012): 168-179.

Nguyen et al. "Bio-inspired assistive robotics: Service dogs as a model for human-robot interaction and mobile manipulation." Biomedical Robotics and Biomechatronics, 2008. BioRob 2008. 2nd IEEE RAS & EMBS International Conference on. IEEE, 2008.

Park et al. "Towards assistive feeding with a general-purpose mobile manipulator." arXiv preprint arXiv:1605.07996 (2016).

Pineau et al. "Towards robotic assistants in nursing homes: Challenges and results." Robotics and autonomous systems 42.3-4 (2003): 271-281.

Prakash et al. "Older adults' medication management in the home: How can robots help?." Human-Robot Interaction (HRI), 2013 8th ACM/IEEE International Conference on. IEEE, 2013.

Rodney Brooks. "The robots are here." Technology Review-Manchester NH-107.1 (2004): 30-30.

Smarr et al. "Domestic robots for older adults: attitudes, preferences, and potential." International journal of social robotics 6.2 (2014): 229-247.

Volosyak et al. "Rehabilitation robot FRIEND II-the general concept and current implementation." Rehabilitation Robotics, 2005. ICORR 2005. 9th International Conference on. IEEE, 2005.

\* cited by examiner

MOBILE MANIPULATION DEVICE

CROSS REFERENCE TO OTHER APPLICATIONS

This application also claims priority to U.S. Provisional Patent Application No. 62/473,778 entitled LOW COST GENERAL-PURPOSE MOBILE MANIPULATOR FOR INDOOR USE filed Mar. 20, 2017 which is incorporated herein by reference for all purposes. This application also claims priority to U.S. Provisional Patent Application No. 62/474,427 entitled LOW COST GENERAL-PURPOSE MOBILE MANIPULATOR FOR INDOOR USE filed Mar. 21, 2017 which is incorporated herein by reference for all purposes. This application also claims priority to U.S. Provisional Patent Application No. 62/626,265 entitled ADDITIONAL HARDWARE AND SOFTWARE FOR A LOW-COST GENERAL-PURPOSE MOBILE MANIPULATOR FOR INDOOR USE filed Feb. 5, 2018 which is incorporated herein by reference for all purposes.

BACKGROUND OF THE INVENTION

People with limited abilities often need an assistant for performing tasks around the home. For example, moving objects, feeding pets, cleaning up, etc., become very difficult tasks for people with difficulty walking around their home or picking up and carrying objects. Even for the able-bodied it would often be preferable to not have to perform some of these tasks, for example, when traveling, busy with work, relaxing, etc. Hiring an assistant to come into the home is expensive and can bring complications, for example introducing the possibilities of theft, employment law issues, etc. However, the world of humans is very messy and difficult for robots to navigate. Only the simplest home robots have shown themselves to be practical (e.g., robotic vacuum cleaners). This creates a problem where robots for more complicated tasks typically require very sophisticated technology, becoming more expensive than hiring a human assistant.

BRIEF DESCRIPTION OF THE DRAWINGS

Various embodiments of the invention are disclosed in the following detailed description and the accompanying drawings.

DETAILED DESCRIPTION

Figure 1:
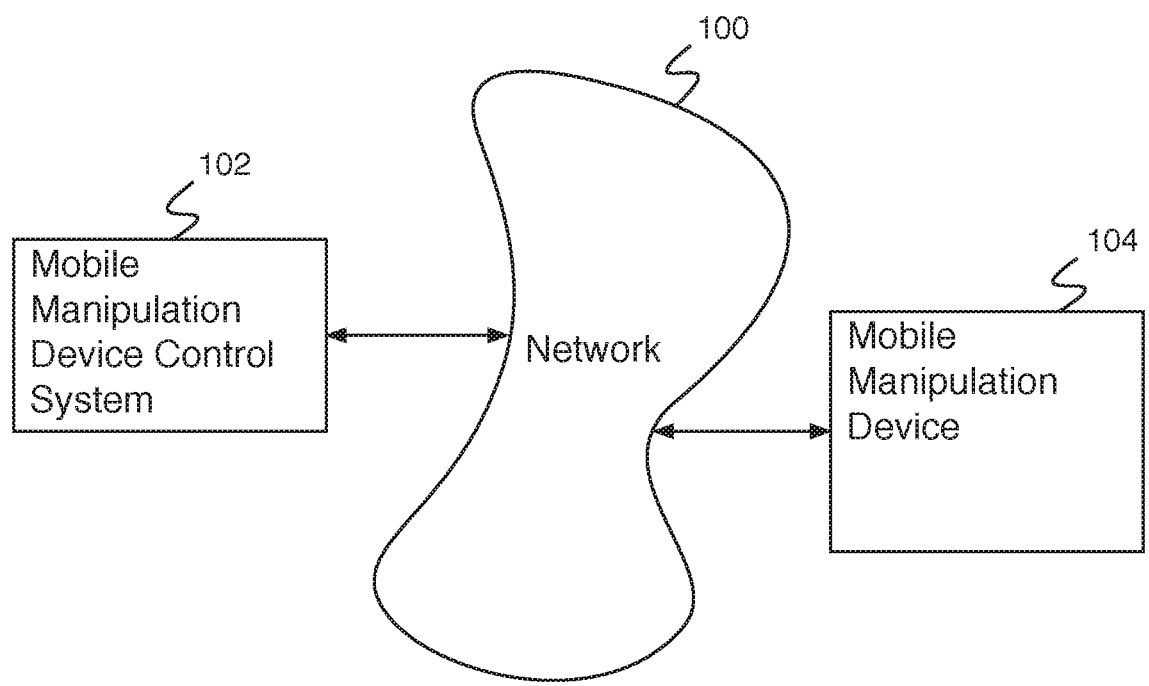
FIG. 1 is a block diagram illustrating an embodiment of a network system for mobile manipulation device control.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A mobile manipulation device is disclosed. The mobile manipulation device comprises a base, a lift, an arm, and a manipulator. The base is able to move across a surface underneath the base. The lift is coupled to the base. The lift moves the arm vertically. The arm moves the manipulator horizontally along one direction. The base is able to move perpendicular to the one direction.

A mobile manipulation device comprises a base, a lift, an arm, and a manipulator. The base moves the lift across a surface using actuators connected to mechanisms such as wheels, tank treads, or articulated links. The base can rotate and translate the lift across the surface and in some embodiments perform other motions. In some embodiments, the base uses two driven wheels. The lift moves the arm vertically—lifting and lowering. The arm moves horizontally—extending and retracting. The base can move perpendicular to the arm's horizontal motion. The manipulator is attached to the arm. Together, the base, lift, and arm result in Cartesian motion of the manipulator. The base is also responsible for moving the lift to different locations and orientations in the environment.

People with limited mobility, cognitive impairment, perceptual difficulties, or reduced dexterity would benefit from a home robot that retrieves requested objects and performs other manipulation tasks. Here a robot is described that can perform manipulation tasks in human environments, such as homes. The robot emulates advantageous characteristics of the human body in a low-cost and highly-simplified form.

A full humanoid robot would be well adapted to manipulating everyday objects in human environments, however the cost would be prohibitive and the robot would be challenging to control. There are several important characteristics of the human body such a robot should have, including sensors and manipulators that are high above the ground, a small footprint, and stability with respect to perturbations, even when reaching out into the environment in order to perform tasks, such as grasping objects. The disclosed device is a robot that emulates these and other humanoid characteristics in a low cost, simplified form.

Two key capabilities of the design are its ability to reach important locations in human environments and its ability to take advantage of the Cartesian structure of human environments, which tend to consist of many horizontal and vertical planes, such as floors, tables, countertops, and cabinets. Some of the novel concepts included follow:

- Use of fewer actuators by using the base during manipulation to achieve movement along an additional orthogonal direction; use of a thin and long telescoping mechanism to reach through clutter instead of the typical approach of reaching around clutter with multiple rotary joints; and use of a Cartesian structure matched to the Cartesian structure of indoor human environments to simplify manipulation.
- Use of smaller actuators by having the arm actuator move a telescoping member orthogonal to gravity to avoid issues of gravitational loading and long moment arms typically associated with a long reach; using a telescoping member rigidly attached to a carriage on the lift and the lift attached to a high-mass mobile base to enable the robot's structure to support the force and moment applied by the telescoping arm to the carriage instead of an actuator; and using a lift actuator that moves a low mass arm assembly up and down, where in some embodiments the arm assembly is low mass due in part to the small arm actuator and the lightweight telescoping structure.
- Reduced need for coordination among actuators due to Cartesian structure in Cartesian environments, which enables independent, serialized control of the mobile base actuators, lift actuator, and telescoping arm actuator to perform many useful tasks in human environments. For example, when reaching to a location, a useful strategy is to first position the base, then raise or lower the arm so that the arm points at the target location, and then extend the arm until the manipulator reaches the location. Each of these motions can be facilitated by cameras and refined with further motions.
- Safe and stable reaching to locations due to a lightweight telescoping arm that is long and has a small cross section to reach through clutter; a statically stable base with a small footprint to navigate to locations in human environments; and a low center of mass resulting from a relatively large mass in the base from components such as the batteries and wheel actuators and a lightweight structure above the base due to the lightweight lift, arm, and manipulator.
- Versatility through specialized manipulators and tools that can be manually or automatically attached to the end of arm. These manipulators and tools may include simple or complex manipulators and tools—for example, simple unactuated tools like a hook, complex actuated mechanisms like a pitch-roll wrist, and/or actuated tools like a vacuum. Other examples of manipulators and tools include: a two actuator wrist with a compliant gripper; a gripper at a fixed orientation; hooks for opening/closing drawers and doors, operating light switches, and operating elevator buttons; a spoon for feeding; an adjustable mobile phone/tablet holder; a dustpan like gripper to pick things up from the ground; a vacuum cleaner brush; a small brush tool and dustpan attached to the arm to sweep debris off surfaces; and tools to leave marks, such as a marker holder with a spring to write on surfaces.
- View of the world from a human perspective without a complex robot head by using cameras with wide fields of view mounted at human eye level.

The disclosed robot design uses a single long, narrow, lightweight telescoping mechanism to reach locations around a person's body. In conjunction with the robot's wheeled base and vertical lift, the robot can directly move objects in orthogonal directions matched to the planar structure of human environments, simplifying control of the robot. This design reduces the robot's overall weight, number of actuators, and actuator requirements. In addition the robot's motions are easier for people to understand and direct.

In some embodiments, this robot design uses four motors: two for the base wheels, one for a long, narrow, lightweight telescoping mechanism that extends horizontally and serves as the robot's arm, and one motor for a vertical lift that raises and lowers the robot's telescoping arm. The robot's arm extends and retracts forward and backward, the lift moves up and down, and the wheels move the robot sideways or rotate the robot. These four motors provide four degree of freedom control of the end of arm (X, Y, Z, and theta). Less than four motors can be used using a clutched transmission and more than four motors can be used using a redundant mechanism. An actuated manipulator or a simple tool, such as a hook or duster, can be attached to the end of the arm. For example, the arm moves a manipulator toward and away from a base mounting pole along an x-axis; the arm is moved up and down along a base mounting pole relative to the floor along a z-axis; and the base mounting pole that protrudes vertically from a base is moved perpendicular to the arm along a y-axis. The base is also enabled to rotate around the axis of the base mounting pole. With these motions the end of the robot's arm can move in four directions using the telescoping arm, the lift, and the wheels.

The use of a long, narrow, lightweight, telescoping mechanism allows the robot to stably reach long distances relative to the footprint size of its wheeled mobile base, and to do so with a relatively small motor. By remaining horizontal, the motion of the arm does not work against gravity when used on the flat ground of indoor human environments. The long reach is especially useful in cluttered human environments, such as when assisting a person by moving an object close to his or her body. A key insight is that a long, thin telescoping arm with Cartesian positioning and a single axis of rotation can reach most locations in human environments and thereby do useful things. In some embodiments, the telescoping arm has a cross section smaller than or similar in size to a cross section of a human arm and a length that is longer than or similar in length to an outstretched human arm. In some embodiments, the telescoping arm is constructed from a series of nested structural elements and sliding elements such as bushings or bearings and is an exoskeleton comprising a hollow structure that provides structural support and also serves as the exterior of the arm.

The drive for the telescoping mechanism uses a large, somewhat stiff cable with electrically conducting wires to push and pull the end of the telescoping mechanism while extending and retracting. The telescoping mechanism can be moved by placing the cable between a high-friction pulley wheel attached to a motor and a passive pulley wheel with both wheels compressed together with springs to maintain contact with the cable. The conducting wires carry power and signals to and from end effectors at the end of the telescoping mechanism. The end effectors can be changed, and the base of the robot can have a tool holder for enabling the robot to automatically change the end effectors. In various embodiments, the end effectors include one or more of the following: an actuated grabber device, a dexterous hand, a robotic wrist, a vacuum, a suction gripper, a dustpan, a duster, a wiping element, a scraper, a hook, a rotary tool, a mop, a mobile phone holder, a tablet holder, a brush, a writing instrument, an eating utensil, a cloth, or any other appropriate tool.

The disclosed mobile manipulator is an improved system because it provides low cost, effective assistance with an intuitive control mechanism as a human helper robot for human spaces.

FIG. 1 is a block diagram illustrating an embodiment of a network system for mobile manipulation device control. In the example shown, mobile manipulation device control system 102 communicates with mobile manipulation device 104 via network 100. Mobile manipulation device control system 102 comprises a computer, a smartphone, custom mobile manipulation device control hardware, an analog mobile manipulation device controller, a digital mobile manipulation device controller, a mobile manipulation device controller including a display, a manual mobile manipulation device controller, an automatic mobile manipulation device controller, a mobile manipulation device controller utilizing artificial intelligence, etc. Mobile manipulation device 104 comprises a mobile manipulation device for performing tasks—for example, picking up objects, carrying objects, cleaning floors or other surfaces, operating machinery, assisting humans, playing with pets, etc. Network 100 comprises one or more of the following: a local area network, a wide area network, a wired network, a wireless network, the Internet, an intranet, a storage area network, or any other appropriate communication network. Mobile manipulation device 104 provides data from sensors (e.g., a top-mounted camera, an arm-mounted camera, a manipulator camera, a grip sensor, a position sensor, microphones, etc.) to mobile manipulation device control system 102. The sensor data is displayed to a user of mobile manipulation device control system 102. A command is received from mobile manipulation device control system 102 and sent to mobile manipulation device 104. The command is translated to cause action in mobile manipulation device 104 (e.g., motion of the arm, manipulator, base, etc.)

Figure 2:
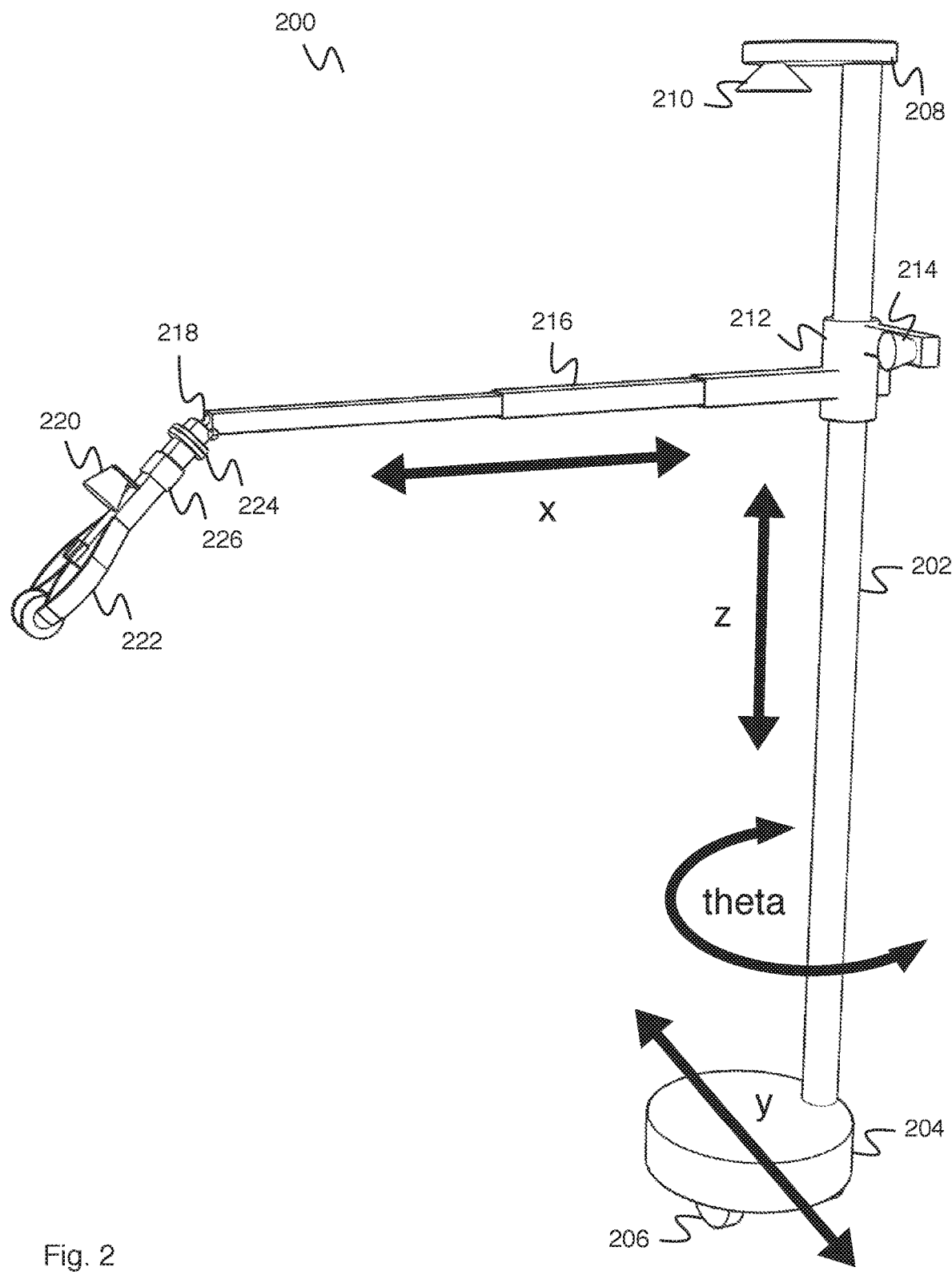
FIG. 2 is a diagram illustrating an embodiment of a mobile manipulation device

FIG. 2 is a diagram illustrating an embodiment of a mobile manipulation device. In some embodiments, mobile manipulation device 200 comprises mobile manipulation device 104 of FIG. 1. In the example shown, mobile manipulation device 200 comprises base 204, vertical lift 202, arm 216, and manipulator 222. Base 204 comprises a base for carrying and moving the elements of mobile manipulation device 200 (e.g., along y axis or rotating around to change theta). Base 204 includes two or more wheels (e.g., wheel 206). The two or more wheels are driven. For example, the two or more wheels are driven together, independently, in common mode (e.g., in the same direction at the same speed), in differential mode (e.g., in opposite directions at the same speed), etc. In some embodiments, base 204 additionally includes an additional wheel, wherein the additional wheel is not driven. For example, the additional wheel comprises an additional wheel for providing static stability (e.g., allowing the mobile manipulation device to balance without control). The additional wheel comprises a pivoting caster, a ball caster, a mecanum wheel, an omniwheel, etc. In some embodiments, base 204 additionally comprises one or more additional wheels, wherein the additional wheels are or are not driven. In various embodiments, base 204 additionally comprises batteries, a computer, speakers, a vertical lift driver for actuating vertical lift 202, or any other appropriate elements.

Vertical lift 202 comprises a vertical lift for carrying, raising, and lowering arm 216 (e.g., along the z-axis). In some embodiments, vertical lift 202 comprises a fixed mast (e.g., a vertical element of fixed dimensions) coupled to a linear actuator (e.g., an actuator for moving an element along a linear path), and arm 216 is coupled to the moving element of the linear actuator. In various embodiments, the linear actuator comprises a belt drive, a lead screw, a ball screw, a linear actuator including a prismatic joint, etc. In some embodiments, vertical lift 202 comprises a telescoping mast (e.g., a vertical element capable of extending or contracting in length), and arm 216 is coupled to a fixed point on the telescoping mast. In the example shown, coupling 212 comprises an actuated coupling for coupling arm 216 to vertical lift 202. A linear actuator included in vertical lift 202 drives coupling 212 and arm 216 up and down.

Camera mounting structure 208 is attached to the top of vertical lift 202 and holds camera 210. Camera 210 comprises a camera for viewing the environment around mobile manipulation device 200. For example, camera 210 comprises a camera facing the ground. When mounted high above the ground, camera 210 can see the tops of surfaces in human environments, like countertops, tables, desks, and manipulable objects in places people commonly place them. In some embodiments, camera 210 comprises a fisheye lens. When near human eye height with a fisheye lens, camera 210 provides a view of the world comparable to a standing human. Camera mounting structure 208 for camera 210 can increase visibility of the surrounding environment by reducing occlusions. Camera mounting structure 208 places the camera away from the mast to reduce occlusion from the mast. In some embodiments, camera mounting structure 208 arcs behind the camera to reduce occlusion, and its structure can use components with thin cross sections oriented parallel to rays emanating from the optical axis of the camera to reduce occlusion. Mobile manipulation device 200 additionally comprises camera 214 mounted on arm 216 so that it can view the arm and the manipulator. Camera 214 is mounted on arm 216 near vertical lift 202 and is facing gripper 222. Camera 214 comprises a camera for viewing the area where gripper 222 is operating. In some embodiments, camera 214 comprises a fisheye lens.

Arm 216 comprises an arm extending horizontally from vertical lift 202 (e.g., along x axis). In the example shown, arm 216 has a square cross-section. In some embodiments, arm 216 has a round cross-section. Other cross sections can be used—both nest and non-nesting. In addition, keyed cross sections can be used that prevent rotation of the telescoping tubes relative to one another. Arm 216 is telescoping—for example, capable of a telescoping action for moving gripper 222 towards or away from vertical lift 202. When the wheels of base 204 are driven in common mode such that mobile manipulation device 200 moves in a straight line, mobile manipulation device 200 moves perpendicular to the direction of arm 216. Arm 216 comprises hinge 218—for example, an actuated hinge for bending. In the example shown, when hinge 218 bends, gripper 222 moves toward the ground. Arm 216 additionally comprises camera 220. Camera 220 is mounted on arm 216 near gripper 222. As gripper 222 moves (e.g., due to the motion of hinge 218 or an actuated rotational coupling), camera 220 moves with it holding gripper 222 static in its frame. Camera 220 allows a close view of the actions of gripper 222. In some embodiments, camera 220 comprises a fisheye lens. Gripper 222 is attached to the end of arm 216. In some embodiments, a different manipulator is attached to the end of arm 216 (e.g., a manipulator for interacting with other objects). For example, manipulator comprises a grabber, an interchangeable tool holder, a vacuum, or a mop. Mobile manipulation device 200 may include a set of interchangeable tools that can be attached to an interchangeable tool holder manipulator. For example, a set of interchangeable tools can be mounted on base 204 and reached by retracting arm 216, folding hinge 218, and lowering arm 216 using vertical lift 212. The interchangeable tool holder attaches to a variety of tools, including, but not limited to, a grabber, a dexterous hand, a vacuum, a suction gripper, a dustpan, a duster, a wiping element, a scraper, a hook, a rotary tool, a mop, a mobile phone holder, a tablet holder, a brush, a writing instrument, an eating utensil, and a cloth.

Arm 216 additionally comprises actuated rotational coupling 224 for rotating. Gripper 222 can be coupled to the rotational coupling 224 via coupling 226. Rotational coupling 224 makes grippers, such as gripper 222, and other tools more versatile. For example, it can be used to turn a door knob that a gripper is holding. When hinge 218 makes the gripper point towards the ground, rotational coupling 224 can orient a gripper to pick up an elongated object sitting on a flat surface from above. Rotational coupling 224 can also enable a hook to be oriented to hook onto both vertical and horizontal drawer handles. Angle sensors on rotational coupling 224 can be used to rotate video from camera 220 to make it look as though the camera was not being rotated by rotational coupling 224 and simplify remote operation by a human.

Camera 210, camera 214, and camera 220 provide video data to an interface and a processor disposed in base 204 of mobile manipulator 200. The processor provides the video data to a mobile manipulation device control system. The mobile manipulation device control system may be remotely located from the robot, allowing for remote teleoperation or autonomous control. The mobile manipulation device control system provides a user one or more views from the video data and receives motion commands from a user. The motion commands are provided to mobile manipulator 200. An interface of mobile manipulator 200 (e.g., a communication interface) receives the commands and provides the commands to a processor of mobile manipulator 200 and are then translated to specific motion commands for actuators of mobile manipulator 200 (e.g., fine or coarse motions for each of base 204, vertical lift 202, arm 216, folding hinge 218, and manipulator 222). In some embodiments, light rings or infrared sources are placed around some or all of the cameras to enable operating in dark rooms and other dark areas like the interior of a container.

In some embodiments, a control system for a mobile manipulation device comprises an interface that enables a remote operator to drive the mobile manipulation device and manipulate objects. The interface is a video-centric interface. The operator directly clicks on or touches one or more video streams to make the mobile manipulation device move. For example, clicking on or touching various parts of the video stream from the navigation camera makes the mobile manipulation device's wheeled base move. Clicking on or touching various parts of the video stream from the arm camera makes the arm move up and down and extend and retract. Clicking on or touching various parts of the video stream from the gripper camera makes the gripper open and close, bend down, straighten up, roll right, and roll left.

The regions are positioned with respect to the mobile manipulation device to make the mapping between a click or touch and mobile manipulation device motion intuitive. For example, clicking on or touching the video above the arm makes it move up, and clicking or touching in front of the arm makes it extend. The interface also provides feedback on the grip force and motor torques by making relevant regions of the video stream turn red with darker, less transparent, red meaning higher force or torque. The operator can use this to better infer what is happening. The red coloring is displayed in the region that when clicked or touched is likely to increase the torque or grip force. Each region of a video stream corresponds with a command can have a distinctive cursor icon associated with it as well as a descriptive text tooltip that appears when the cursor is held in the region for an extended duration. All commands are executed with a single click or touch, which results in one of the robot's joints moving a predefined distance/angle or executing a predefined autonomous motion of a short and bounded time. Some clickable or touchable regions in the video move over greater or smaller distances/angles. This is similar to a 'jog mode' on a Computer Numerical control (CNC) machine where coarse and fine motion of individual axes can be attained using a click button interface. The short bounded time of the resulting motion in 'jog mode' allows the robot to safely test small motions, observe in the video how they change the state of the world, and then adjust the subsequent set of jog commands. It also allows the user to remove their attention from the robot operation at any time without having to consider returning to a robot that is an unsafe state.

In some embodiments, the interface rotates the gripper video to make it appear as though the camera is always in the same orientation with respect to gravity (i.e., the ceiling is always at the top of the image and the floor is always at the bottom) in spite of the camera rolling with the gripper. In some embodiments, there is also a microphone mounted to the gripper that provides audio feedback to the operator about objects being manipulated and helps the operator hear what the mobile manipulation device is doing, providing better situational awareness.

In some embodiments of the interface, the interface comprises multiple user selectable operator interface modes that map to primary usages of the robot. In some embodiments, a navigation mode, a manipulation mode, a grasp object from the top mode, and a grasp object from the side mode are provided. The navigation mode shows the navigation camera rotated such that the top of the video is the direction of forward motion of the mobile manipulation device. It also shows the arm camera to help the user avoid hitting the arm into something while driving the mobile manipulation device. The manipulation mode shows the navigation camera rotated such that the top of the video is the direction that the arm extends. It also shows the gripper camera. The grasp object from the top mode and grasp object from the side mode only show the gripper camera and allow the operator to use commands that move the gripper as though it were flying in space unattached to the mobile manipulation device. As illustrated, each user interface mode presents one or more camera video streams that are zoomed, cropped, translated, and otherwise modified to present a very intuitive mapping between what the operator sees, what the operator clicks on, and what the robot does to accomplish its task.

By making the control system for the mobile manipulation system intuitive and easy to use, control of the mobile manipulation system becomes available to a wide range of non-specialized user. The control system allows control of all degrees of freedom of the mobile manipulation system with only a mouse and using a display with minimal distractions. In some embodiments, a user can command the system by touching the display rather than using a mouse. The system includes a plurality of cameras allowing the user to see different context for mobile manipulator system motions and automatically determines a user interface behavior based on the camera currently being displayed. This control system for a mobile manipulation system significantly broadens the ability of manipulator robots to perform useful work in the home.

Figure 3:
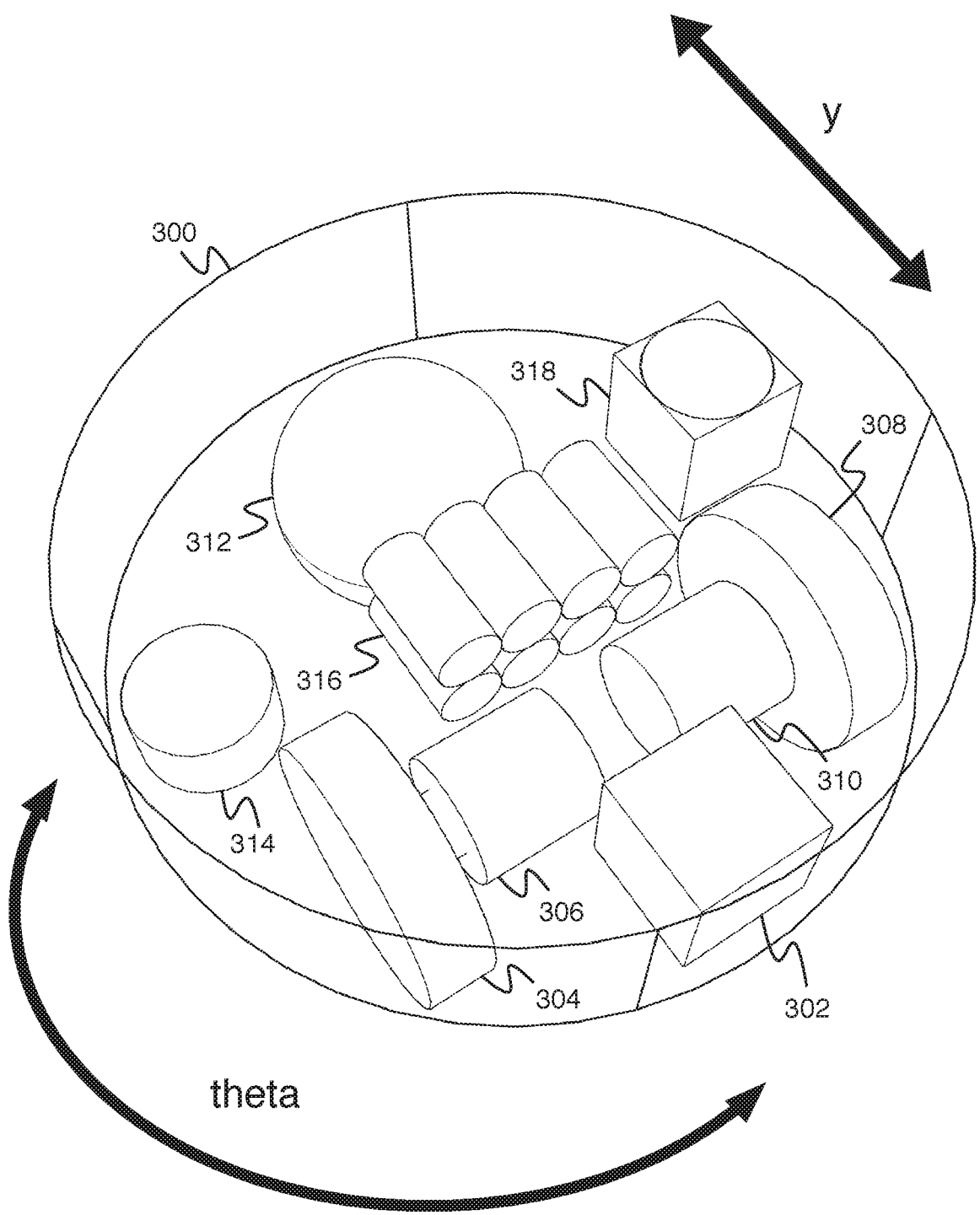
FIG. 3 is a diagram illustrating an embodiment of a base.

FIG. 3 is a diagram illustrating an embodiment of a base. In some embodiments, base 300 comprises base 204 of FIG. 2 (e.g., a base of a mobile manipulation device). In the example shown, base 300 includes wheel 304 and wheel 308. Wheel 304 and wheel 308 comprise wheels for driving the mobile manipulation device. Wheel 304 and wheel 308 are capable of driving the mobile manipulation device in a straight line when driven in common mode (e.g., in the same direction at the same rate) or of turning the mobile manipulation device when driven in differential mode (e.g., in opposite directions at the same rate). In the example shown, wheel 304 is driven by driver 306 and wheel 308 is driven by driver 310. In some embodiments, wheel 304 and wheel 306 are driven by a single driver (e.g., including a switchable drive train for driving wheel 304 and wheel 306 in common mode or in differential mode). Base 300 additionally comprises wheel 312. Wheel 312 comprises a third wheel that is not driven. In the example shown, wheel 312 comprises a ball caster. In various embodiments, wheel 312 comprises a pivoting caster, a mecanum wheel, an omniwheel, or any other appropriate wheel type. Wheel 312 comprises a wheel for providing static stability. In some embodiments, base 300 additionally comprises one or more additional wheels, wherein the wheels are driven or not driven.

Base 300 additionally comprises computer 302. Computer 302 comprises a computer including an interface system, a memory, a processor, data storage, etc. Computer 302 communicates with a mobile manipulation device control system (e.g., mobile manipulation device control system 102 of FIG. 1) via a network for providing data (e.g., camera data, microphone data, actuator data, sensor data, etc.) and for receiving control information. Computer 302 comprises connections to other systems of the mobile manipulation device, for example, a power connection to battery 316, driver connections to driver 306 and driver 310, a controller connection to vertical lift controller 314, an audio data connection to send audio data to speaker 318, an audio data connection to send audio data from a microphone on the robot to the mobile manipulation device control system, a video data connection to receive data from one or more cameras, an arm controller to cause a manipulator to move toward and away from a vertical lift, a hinge controller to control a hinge motion bending a manipulator up or down, a manipulator controller for opening or closing a manipulator, a manipulator controller for rotating the manipulator, etc. Vertical lift controller 314 comprises a vertical lift controller for holding and actuating a vertical lift to move an arm up and down. Battery 316 comprises a battery pack for powering the mobile manipulation device. Speaker 318 comprises a speaker for providing audio (e.g., providing audio feedback to a user of the mobile manipulation device) and in some implementations enabling a remote human operator or artificial intelligence to communicate with people near the robot.

Figure 4:
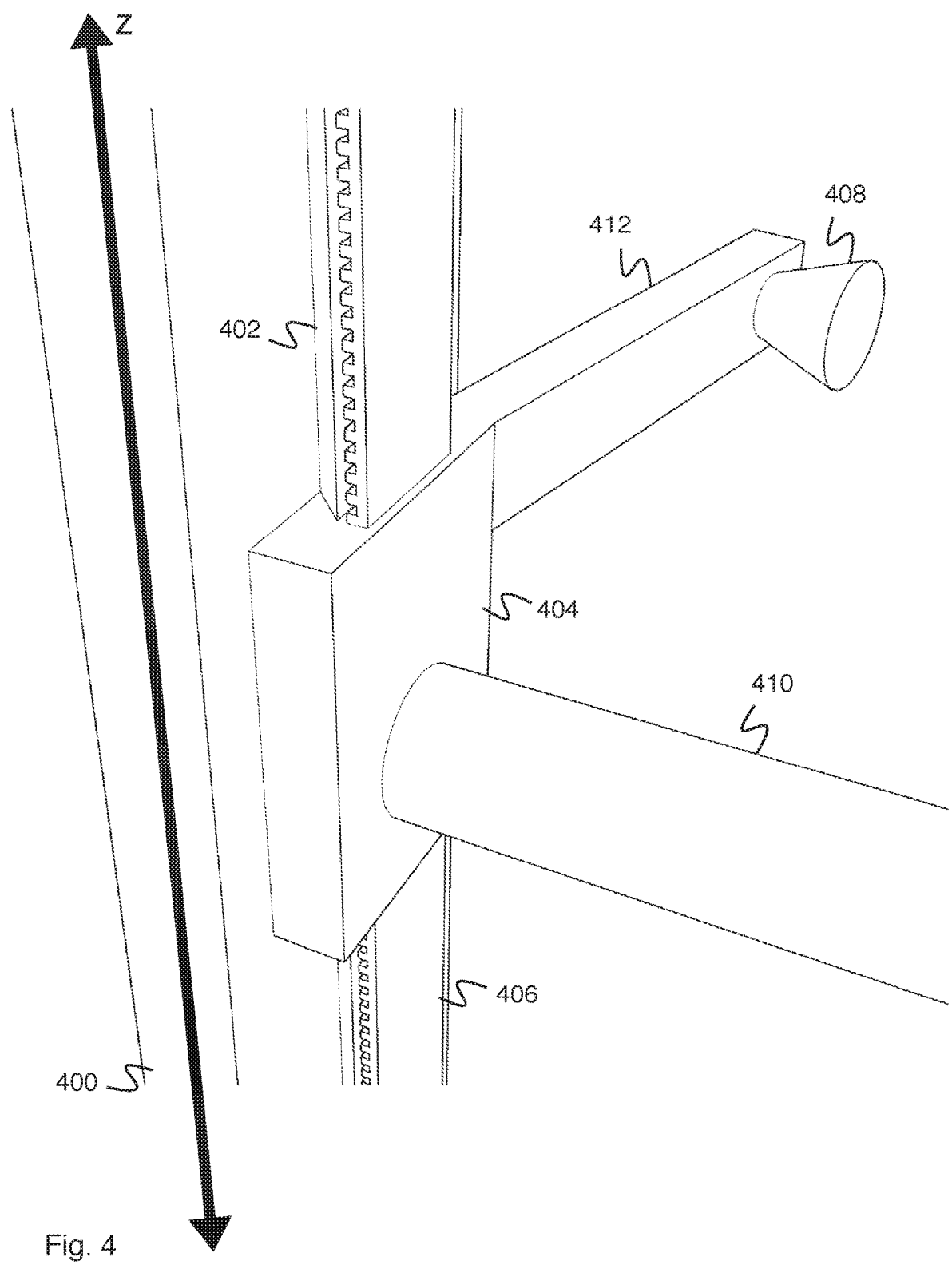
FIG. 4 is a diagram illustrating an embodiment of a belt-driven linear actuator.

FIG. 4 is a diagram illustrating an embodiment of a belt-driven linear actuator. In some embodiments, the belt driven linear actuator of FIG. 4 comprises vertical lift 202 and coupling 212 of FIG. 2. In the example shown, mast 400 comprises a vertical mast for holding the linear actuator. Rail 402 is fastened to mast 400. Rail 402 comprises a trapezoidal shape. Slider 404 comprises a slider for sliding linearly on rail 402. Slider 404 comprises a trapezoidal gap that fits the trapezoidal shape of rail 402. The trapezoidal coupling prevents slider 404 from moving in any direction other than up and down. Together, slider 404 and rail 402 form a prismatic joint. Belt 406 drives slider 404 up and down. Belt 406 is driven by a vertical lift actuator (e.g., a vertical lift actuator mounted in a mobile manipulation device base). Arm 410 is mounted to slider 404 and extends horizontally. In the example shown, arm 410 has a round cross-section. Camera 408 is mounted to arm 412 via slider 404 and is offset from the arm 412 in order to see arm 410 and a manipulator from the side.

In some embodiments, a compliant grabber device comprises two compliant fingers each with a suction cup fingertip. In some embodiments, each compliant finger has a compliant linkage that comprises two strips of material that behave as springs with one strip of material rigidly affixed to a housing and the other strip of material moved via an actuator to bend the finger. In some embodiments, the actuator pulls on a cable attached to the compliant linkages in order to cause the fingers to close and the return force of the springs causes the fingers to open when the cable tension is released. In some embodiments, a linear actuator rigidly attached to the compliant linkages pulls on the compliant linkages to cause the fingers to close and pushes on the compliant linkages to cause the fingers to open. In some embodiments, bend sensors mounted on the fingers provide signals with information about the kinematics and dynamics of the compliant grabber device. In some embodiments, an actuator used to move the fingers provides voltage, current, and kinematic signals with information about the kinematics and dynamics of the compliant grabber device.

Figure 5:
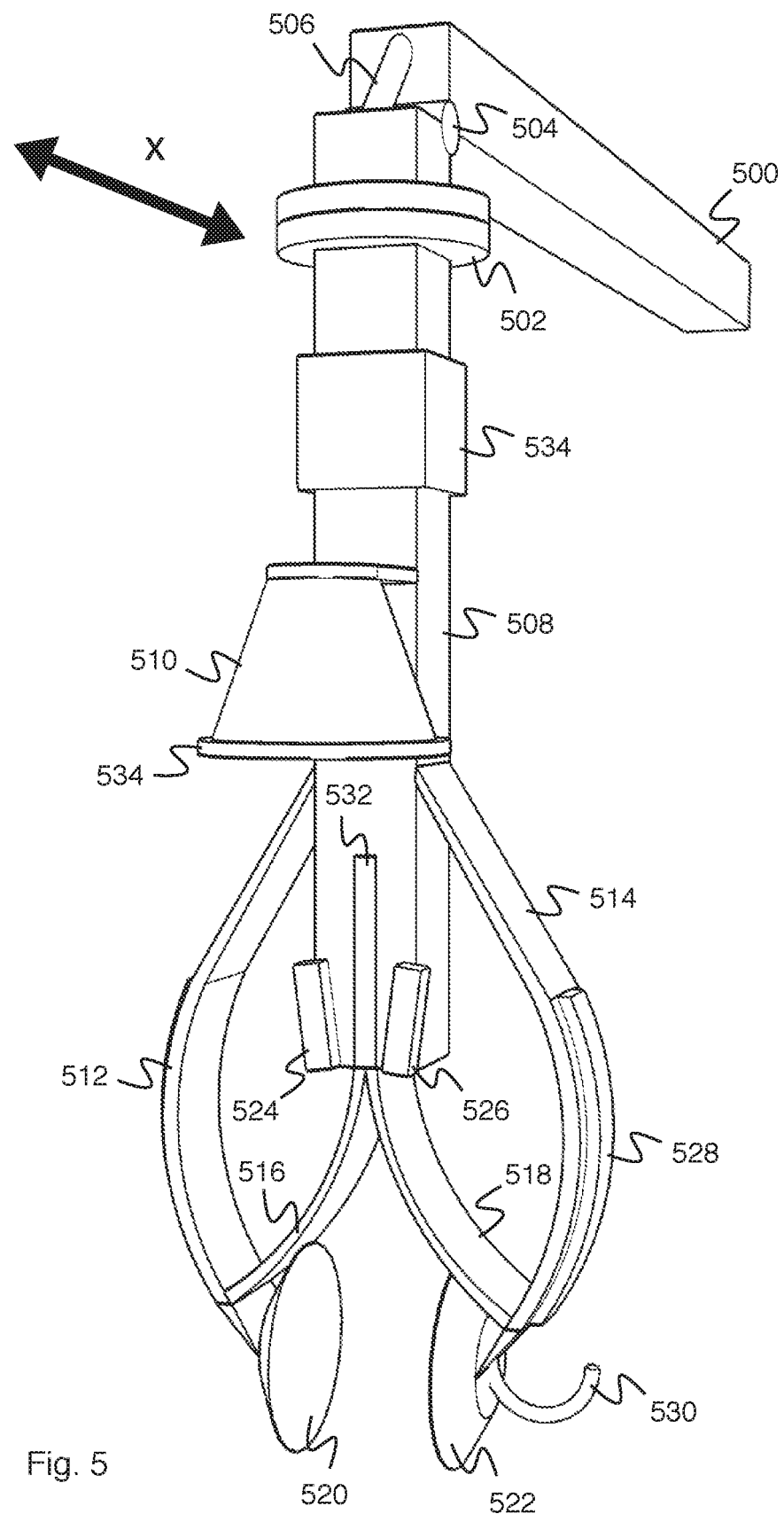
FIG. 5 is a diagram illustrating an embodiment of a manipulator end.

FIG. 5 is a diagram illustrating an embodiment of a manipulator end. Arm 500 comprises an arm of a mobile manipulation device. In some embodiments, arm 500 comprises arm 216 of FIG. 2. In the example shown, arm 500 has a square cross-section. Arm 500 comprises rotational coupler 502. Rotational coupler 502 comprises an actuated rotational coupling for rotating. Arm 500 additionally comprises hinge 504 including hinge actuator 506. Hinge 504 comprises an actuated hinge for bending. Arm 500 additionally comprises arm end 508. Arm end 508 rotates when actuated by rotational coupler 502 and swings when actuated by hinge 504. Camera 510 is mounted on arm end 508. Camera 510 includes ring light 534 to illuminate area in front of camera 510.

Arm end 508 additionally comprises spring 512 and spring 514, spring 516 and spring 518, and grabber 520 and grabber 522. Spring 516 and spring 518 comprise spring elements capable of being actuated by being drawn into the end of arm end 508. In some embodiments, spring 516 and spring 518 are connected to a cable pulled and released by an actuator. In some embodiments, an actuator is rigidly coupled to spring 516 and spring 518 to push and pull them. In the example shown, linear actuator 532 is rigidly coupled to spring 516 and spring 518. When spring 516 and spring 518 are drawn into the end of arm end 508, spring 512 and spring 514 are pulled together, and grabber 520 and grabber 522 are pulled together. Grabber 520 and grabber 522 can pick up an object in this way. When the actuation is reversed, spring 512 and spring 514 return to their default positions or, in the case of a rigid coupling, can be pushed out to open beyond their default positions. When spring 516 and spring 518 are pushed out of the end of arm end 508, spring 512 and spring 514 are pushed apart, and grabber 520 and grabber 522 are pushed apart. Grabber 520 and grabber 522 can reach around a larger object than would fit between them in their default position in this way. Hook 530 attached to the outside of grabber 522 can be used to hook onto drawer handles, light switches, door handles, and other objects and be used in other manipulation tasks.

In various embodiments, hook 530 is rectangular, the protruding end of an L-shaped attachment to the gripper, or any other appropriate shape.

Arm end 508 additionally comprises laser light source 524 and laser light source 526. For example, laser light source 524 and laser light source 526 comprise laser pointers. Laser light source 524 and laser light source 526 are positioned at a slight angle to arm end 508 such that the light from laser light source 524 converges with the light from laser light source 526 between grabber 520 and grabber 522 (e.g., converging on a point indicating where the manipulator will interact when actuated). When the manipulator is being maneuvered into a position to grab an object using grabber 520 and grabber 522, light from light source 524 and laser light source 526 reflecting from the object can be used to judge where the object is relative to grabber 520 and grabber 522 (e.g., when viewing images captured by camera 510).

Bend sensors (e.g., bend sensor 528 on spring 514) mounted on spring 512 and spring 514 provide information about the state of the gripper. The actuator coupled to spring 516 and spring 518 provides current, voltage, and kinematic information about the state of the gripper. For example, together, this information can be used to detect contact, estimate the applied grip force, estimate the width of the opening of the gripper when grasping an object, and perform other sensing.

Coupler 534 is used to quickly attach or decouple different tools from the end of arm 500.

Figure 6:
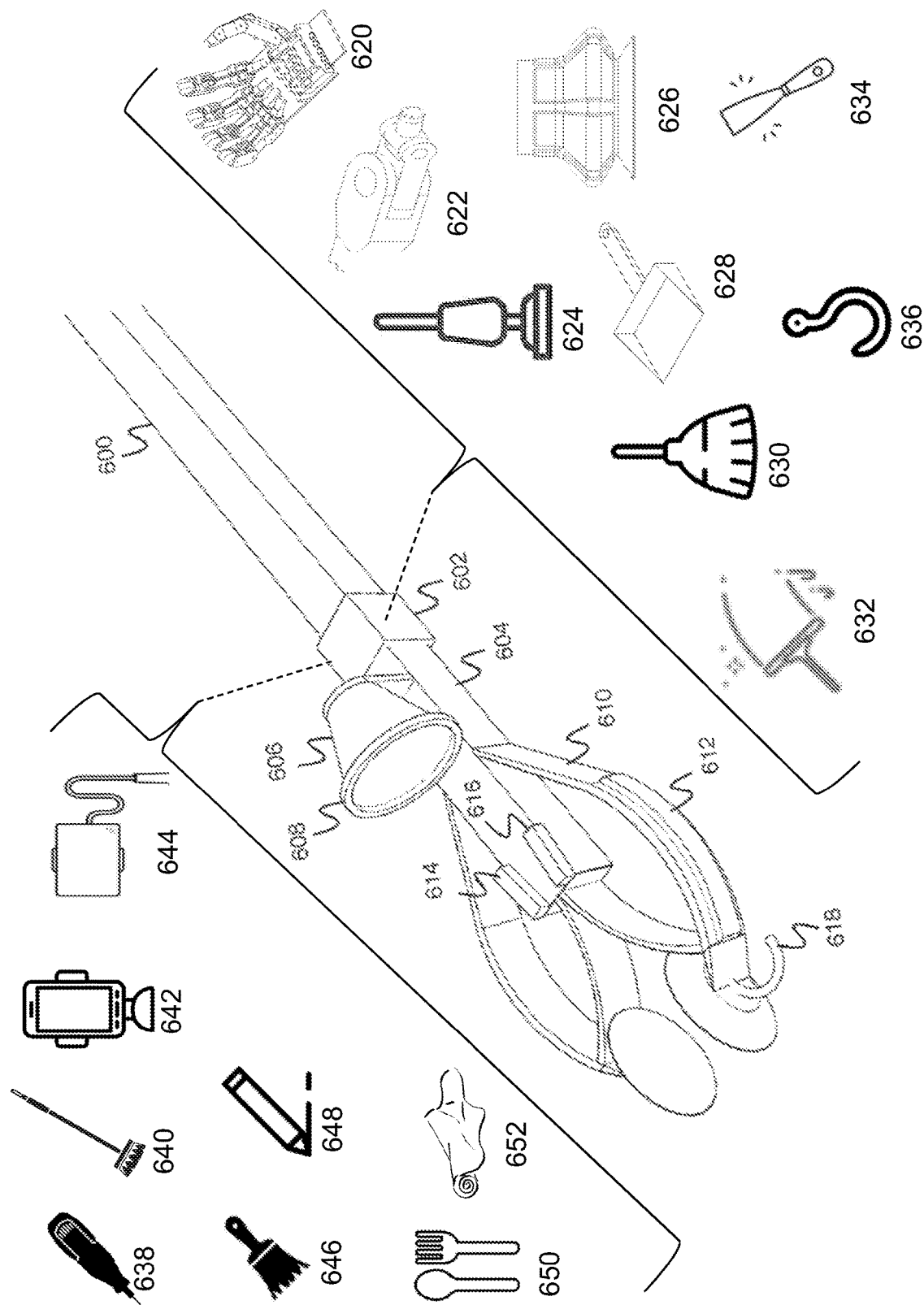
FIG. 6 is a diagram illustrating an embodiment of a manipulator end.

FIG. 6 is a diagram illustrating an embodiment of a manipulator end. Arm 600 comprises an arm of a mobile manipulation device. In some embodiments, arm 600 comprises arm 216 of FIG. 2. In the example shown, arm 600 has a square cross-section. Arm 600 additionally comprises arm end 604. Camera 606 is mounted on arm end 604. Camera 606 includes ring light 608 to illuminate area in front of camera 606.

Arm end 604 additionally comprises springs (e.g., spring 610) and grabbers (e.g., springs and grabbers similar to FIG. 5). The spring elements are capable of being actuated by being drawn into the end of arm end 604. In some embodiments, springs are connected to a cable pulled and released by an actuator. In some embodiments, an actuator is rigidly coupled to springs to push and pull them. When springs are drawn into the end of arm end 604, springs are pulled together, and grabbers are pulled together. Grabbers can pick up an object in this way. When the actuation is reversed, springs return to their default positions or, in the case of a rigid coupling, can be pushed out to open beyond their default positions. When springs are pushed out of the end of arm 604, springs are pushed apart, and grabbers are pushed apart. Grabbers can reach around a larger object than would fit between them in their default position in this way. Hook 618 attached to the outside of grabber can be used to hook onto drawer handles, light switches, door handles, and other objects and be used in other manipulation tasks.

Arm end 604 additionally comprises laser light source 614 and laser light source 616. For example, laser light source 614 and laser light source 616 comprise laser pointers. Laser light source 614 and laser light source 616 are positioned at a slight angle to arm end 604 such that the light from laser light source 614 converges with the light from laser light source 616 between grabbers (e.g., converging on a point indicating where the manipulator will interact when actuated). When the manipulator is being maneuvered into a position to grab an object using grabbers, light from light source 614 and laser light source 616 reflecting from the object can be used to judge where the object is relative to grabbers (e.g., when viewing images captured by camera 606).

Bend sensors (e.g., bend sensor 612 on spring 610) mounted on springs provide information about the state of the gripper. The actuator coupled to springs provides current, voltage, and kinematic information about the state of the gripper. For example, together, this information can be used to detect contact, estimate the applied grip force, estimate the width of the opening of the gripper when grasping an object, and perform other sensing.

Coupler 602 is used to quickly attach or decouple different tools from the end of arm 600. In some embodiments, in place of an actuated grabber device, the coupler 602 can receive a dexterous hand 620, a robotic wrist 622, a vacuum 624, a suction gripper 626, a dustpan 628, a duster 630, a wiping element 632, a scraper 634, a hook 636, a rotary tool 638, a mop 640, a mobile phone holder 642, a tablet holder 644, a brush 646, a writing instrument 648, an eating utensil 650, or a cloth 652.

Figure 7:
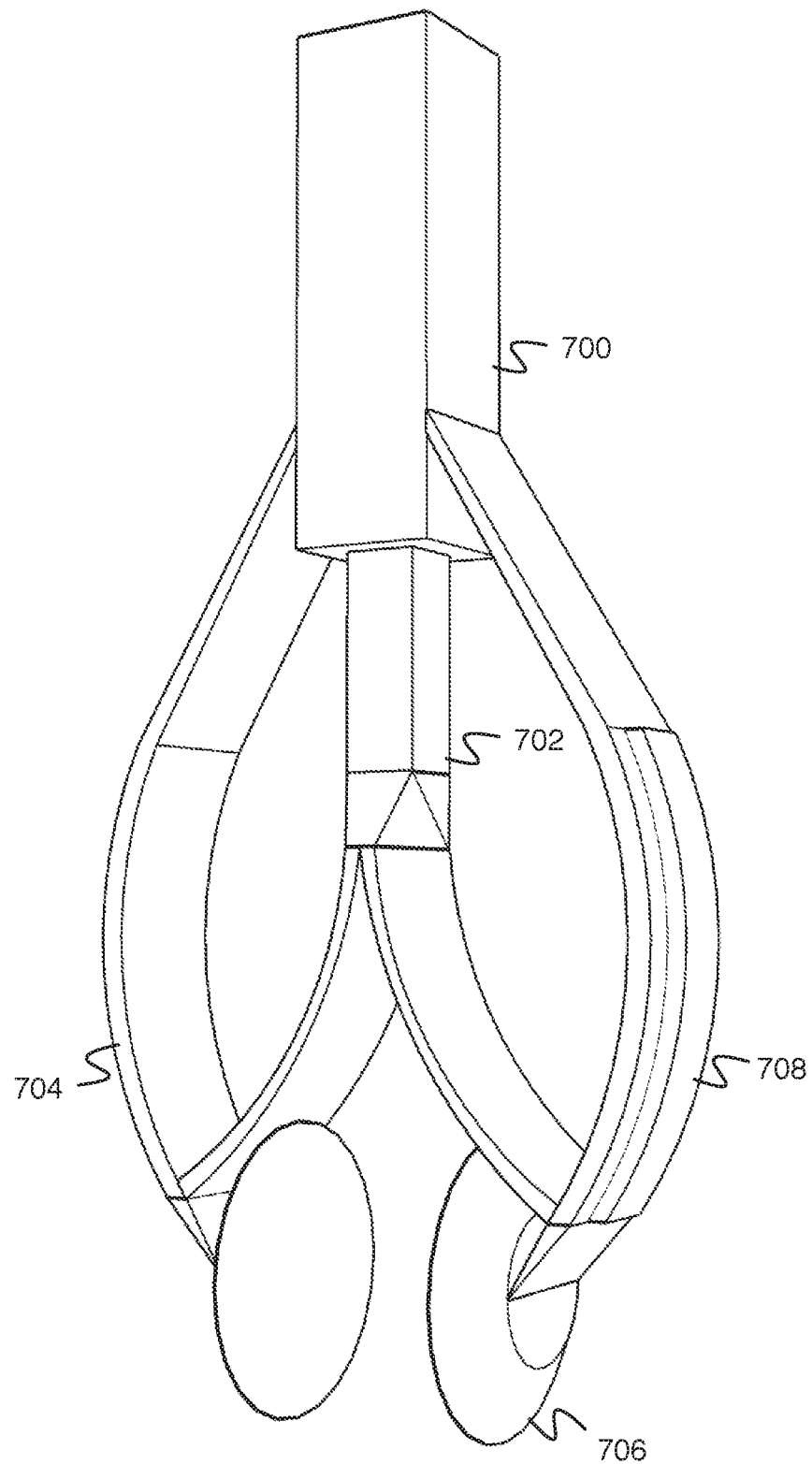
FIG. 7 is a diagram illustrating an embodiment of a manipulator end.

FIG. 7 is a diagram illustrating an embodiment of a manipulator end. In some embodiments, arm 700 comprises arm 216 of FIG. 2. In the example shown, arm 700 includes an actuator internal to arm 700 able to extend and retract coupler 702. When coupler 702 is retracted outer spring 704 and outer spring 708 move grippers inward (e.g., gripper 706). When coupler 702 is extended outer spring 704 and outer sprint 708 move grippers outward (e.g., gripper 706).

Figure 8:
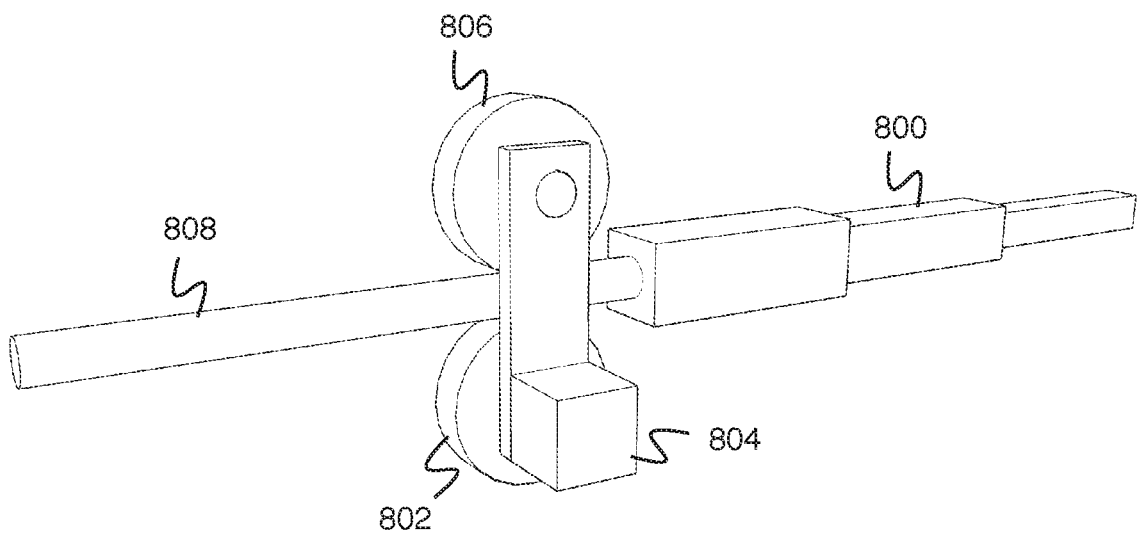
FIG. 8 is a diagram illustrating an embodiment of an arm actuator.

FIG. 8 is a diagram illustrating an embodiment of an arm actuator. In some embodiments, arm 800 is used to implement x axis motion of arm 216. In the example shown, arm 800 is actuated using stiff but flexible cable 808 and causes arm to extend and retract. Actuator 804 is for moving drive pulley wheel 802. In some embodiments, cable includes power and signal conductors used by a tool at the end of the arm. Unactuated pulley wheel 806 and actuated pulley wheel 802 are held together with compliant springs to move stiff cable 808 (e.g., a friction drive pulley). Hollow nested elements of arm 800 enable the end of arm 800 to extend and retract.

In some embodiments, the telescoping arm has a cross section smaller than or similar in size to a cross section of a human arm. The small cross section, long reach, and low mass of the telescoping arm are important features of the actual invention, since they enable the arm to stably reach places in human environments. In some embodiments, the telescoping arm has a length that is longer than or similar in length to an outstretched human arm. In some embodiments, the telescoping arm is constructed from a series of nested structural elements and sliding elements such as bushings or bearings. In some embodiments, the telescoping arm is an exoskeleton comprising a hollow structure that provides structural support and also serves as the exterior of the arm. In some embodiments, the telescoping mechanism is driven by an element that contains power and signal conductors. In some embodiments, the power and signal conductors in the cable used to extend or retract the arm are used by the manipulator or tool attached to the end of the telescoping arm.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A mobile manipulation device, comprising:
    a unibody base comprising a first actuator and a second actuator, the first actuator and the second actuator configured to cause the mobile manipulation device to travel across a surface underneath the unibody base;
    a vertical mast directly affixed to the unibody base;
    an actuated coupling coupled to the vertical mast and including a fourth actuator, the actuated coupling configured to travel along the mast via actuation of a third actuator and including a receiving portion integrally formed within the actuated coupling;
    a telescoping arm including a proximal segment received within the receiving portion of the actuated coupling and at least one distal segment slidably engaged with and received within the proximal segment, wherein the telescoping arm extends or retracts horizontally with respect to the vertical mast via a flexible element coupled to the telescoping arm and extending between a first pulley wheel and a second pulley wheel, the second pulley wheel actuated via the fourth actuator configured in an inferior position relative to the flexible element and the first pulley wheel;
    a manipulator coupled to the at least one distal segment.

2. The mobile manipulation device of claim 1, wherein the unibody base has two wheels that are driven.

3. The mobile manipulation device of claim 2, wherein the unibody base includes one or more additional wheels, wherein the one or more additional wheels are not driven.

4. The mobile manipulation device of claim 2, wherein the unibody base includes one or more additional wheels, wherein the one or more additional wheels are driven.

5. The mobile manipulation device of claim 1, wherein the actuated coupling includes a belt-driven linear actuator.

6. The mobile manipulation device of claim 5, wherein the belt-driven linear actuator includes a trapezoidal-shaped rail coupled to the vertical mast and a slider coupled to the trapezoidal-shaped rail.

7. The mobile manipulation device of claim 6, wherein the telescoping arm is coupled to the slider.

8. The mobile manipulation device of claim 1, wherein the telescoping arm extends horizontally using a series of linkages.

9. The mobile manipulation device of claim 1, wherein the flexible element contains power and signal conductors used by the manipulator.

10. The mobile manipulation device of claim 1, wherein the manipulator comprises one or more actuated joints for bending and rotating.

11. The mobile manipulation device of claim 1, wherein the manipulator comprises an actuated grabber device.

12. The mobile manipulation device of claim 11, wherein the manipulator comprises a coupler to receive the actuated grabber device.

13. The mobile manipulation device of claim 12, wherein the coupler can alternatively receive one of a dexterous hand, a robotic wrist, a vacuum, a suction gripper, a dustpan, a duster, a wiping element, a scraper, a hook, a rotary tool, a mop, a mobile phone holder, a tablet holder, a brush, a writing instrument, an eating utensil, or a cloth.

14. The mobile manipulation device of claim 11, wherein the actuated grabbing device includes a laser light source.

15. The mobile manipulation device of claim 11, wherein the actuated grabbing device includes a bend sensor mounted on a spring of the actuated grabber device.

16. The mobile manipulation device of claim 1, further comprising a first camera mounted at a top of the vertical mast facing towards the surface underneath the unibody base.

17. The mobile manipulation device of claim 16, wherein the first camera includes a fisheye lens.

18. The mobile manipulation device of claim 1, further comprising a second camera mounted on the arm facing towards the manipulator.

19. The mobile manipulation device of claim 1, further comprising a third camera mounted on the manipulator facing towards a tool at an end of the manipulator.

20. The mobile manipulation device of claim 1, wherein the mobile manipulation device is coupled via a network to a control system, the control system including a touchscreen video interface for a user to control the mobile manipulation device.

21. The mobile manipulation device of claim 20, wherein the touchscreen video interface provides a grip force of the manipulator or a torque of any of the first actuator, the second actuator, the third actuator, or the fourth actuator as a color overlay atop regions of a video stream displayed via the touchscreen video interface.

22. The mobile manipulation device of claim 21, wherein the regions of the video stream include an icon and a text tooltip displayed within the regions and each region corresponds to a control command configured to cause a joint of the mobile manipulation device to move in a predetermined sequence of movement or to cause the mobile manipulation device to move in an autonomous motion.

* * * * *